United States Patent
Roadarmel

[11] 4,177,537
[45] Dec. 11, 1979

[54] ARM TO BLADE CONNECTOR

[75] Inventor: Gary W. Roadarmel, Michigan City, Ind.

[73] Assignee: The Anderson Company of Indiana, Gary, Ind.

[21] Appl. No.: 963,988

[22] Filed: Nov. 27, 1978

[51] Int. Cl.² ............................................. B60S 1/40
[52] U.S. Cl. ................................................ 15/250.32
[58] Field of Search ........................ 15/250.32–250.42

[56] References Cited

U.S. PATENT DOCUMENTS

| | | | |
|---|---|---|---|
| 2,046,495 | 7/1936 | Whitted | 15/250.32 |
| 2,172,928 | 9/1939 | Anderson | 15/250.32 |
| 2,229,719 | 1/1941 | Bramming | 15/250.32 |
| 3,576,044 | 4/1971 | Besnard | 15/250.32 |

FOREIGN PATENT DOCUMENTS 2254959  7/1975  France ................................. 15/250.32

Primary Examiner—Peter Feldman
Attorney, Agent, or Firm—Wegner, Stellman, McCord, Wiles & Wood

[57] ABSTRACT

A connector is provided for connecting one type arm end connector to a cross pin of a cross pin-type wiper blade. The connector has a body portion having a longitudinal axis with one part of the body portion receiving the end of a wiper arm and a second part of said body portion engaging the cross pin of the blade. Said second part has a pin-receiving slot in the forward facing wall and a pair of sidewardly-urged latch legs having contact surfaces spaced from the transverse axis of said pin-receiving slot. The legs are squeezed together as the pin-receiving slot is aligned with the cross pin and the squeezed legs are threaded between the side walls of the blade. The legs are released as the slot of the connector is snapped over the pin. The connector is rotated about the axis of the pin until the latch legs snap out of the opening between the walls of the blade. The contact surfaces of the legs are spaced above the edges of the walls of the blade as the connector and its associated arm are articulated relative to the blade through the normal range of blade and arm movement. The connector cannot be removed from the blade without first squeezing the legs against the body portion and pivoting the connector relative to the blade to move the legs between the walls of the blades whereupon the connector can be pulled transverse to the axis of the blade to unsnap the connector from the blade.

10 Claims, 4 Drawing Figures

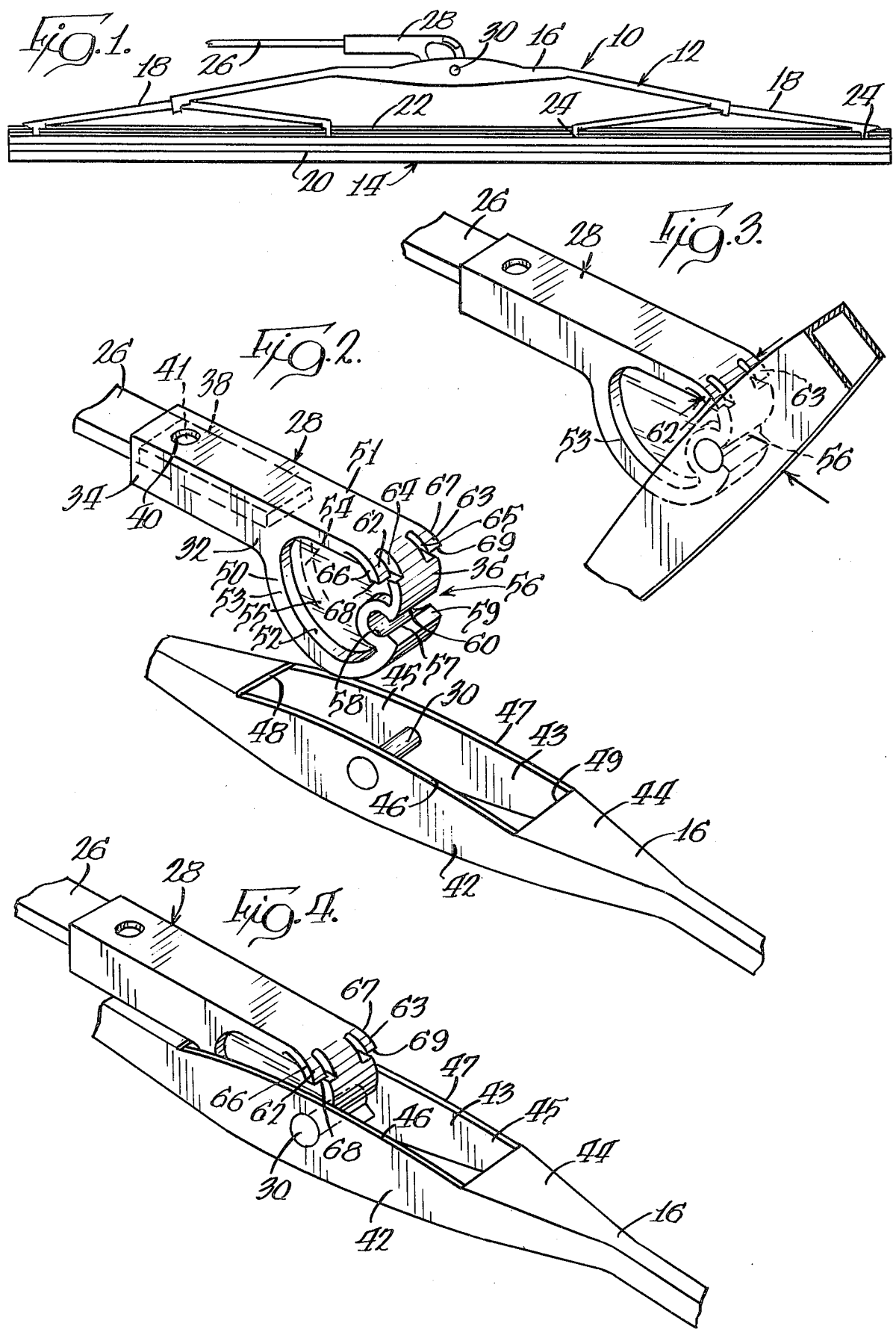

ARM TO BLADE CONNECTOR

BACKGROUND OF THE INVENTION

1. Field of the Invention

This invention relates to windshield wiper blades and arms and, in particular, to a connector for connecting a windshield wiper arm and a wiper blade.

2. Description of the Prior Art

Traditionally, manufacturers of windshield wiper equipment design improved connectors between the ends of windshield wiper arms and the backs of windshield wiper blades so as to make the connection between the two highly reliable in use while still making it possible to easily separate the arm from the blade when required.

The U.S. Pat. No. 2,046,495 to J. B. Whitted shows a connector for a wiper arm to a blade wherein the connector is inserted in the blade along an axis transverse to the axis of the blade and the blade is rotated relative to the arm so that the axis of the blade and arm are parallel such that at that point the connection between the arm and the blade is trapped and cannot be separated without reorienting the arm along an axis transverse to the axis of the blade.

The U.S. Pat. No. 2,229,719 to C. Bramming shows a connector between an arm and a blade where the adaptor has a hook-shaped end which is passed under a cross pin on a blade when the adaptor is at a right angle to the blade whereupon pivoting the arm and connector to a position somewhat parallel to the blade will secure the arm to the blade and prevent detachment therebetween.

U.S. Pat. No. 2,172,928 to J. W. Anderson, likewise, shows a connector for connecting an arm to a blade where the connector is oriented to fit under a cross pin when the arm and blade are at right angles to each other whereupon rotating the arm relative to the blade so as to be parallel thereto traps the connection between the arm and the blade.

The French Patent of Addition No. 73-45226, addition to French Pat. No. 2,254,959, shows a connector which is oriented at an angle to a blade to connect the connector to the blade whereupon pivoting the arm and connector relative to the blade traps the connector in the opening to prevent ready removal of the connector from the blade.

All of these connectors and adaptors suffer the same problem in that the arm and blade can rotate relative to each other and become disconnected. For instance, when the arm is lifted from a windshield to clean under the blade, the blade can pivot relative to the arm and become disconnected since there is no positive latch therebetween.

SUMMARY OF THE INVENTION

I have provided an improved connector between a wiper arm and a blade which is positively locked to the blade until, or unless, the latching arrangement is affirmatively disengaged, thereby permitting the connector to be separated from the blade.

The connector has a slot in a forward wall oriented generally in the direction of the longitudinal axis of the connector. A pair of sidewardly extending latch legs are carried by the connector and have contact surfaces spaced from the transverse axis of the slot. To assemble the connector to a blade, the legs are depressed and the connector is oriented at a substantially right angle to the axis of the blade, the slot in the connector is engaged with the cross pin as the legs are threaded down between the walls of the opening in the blade. When the slot in the connector is secured on the cross pin, the connector is rotated relative to the blade until the latch legs snap outwardly to assume a position above the edges of the walls of the opening in the blade. The blade is free to articulate relative to the arm through a limited degree of movement, but any attempt to rotate the arm relative to the blade beyond a predetermined amount brings the edges of the opening into contact with the contact surfaces of the legs on the connector and will prevent further rotation of the blade relative to the arm. The arm can only be removed from the blade by depressing the legs on the connector until the legs can be threaded inside the walls forming the opening in the blade, whereupon the slot can be unsnapped from the cross pin to separate the arm from the blade.

The connector with the improved latching arrangement can be positively locked to a blade and cannot be released from the blade without an affirmative step being performed by an operator.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view of a windshield wiper blade and arm with my improved connector thereon;

FIG. 2 is an exploded perspective view of a wiper arm end and a bridge of a blade of a wiper blade with my improved connector mounted on the end of the arm;

FIG. 3 is a perspective view similar to FIG. 2 only with the blade rotated approximately 90° and initially positioned on the connector; and FIG. 4 is a perspective view similar to FIG. 2 only showing my connector connected to the blade.

DESCRIPTION OF THE PREFERRED EMBODIMENT

Referring to FIG. 1, a windshield wiper blade 10 is comprised of a superstructure 12 and a resilient wiping element 14. The superstructure 12, as illustrated, has a bridge or primary yoke 16 and a pair of secondary yokes 18 articulated at the ends of the primary yoke. The resilient wiping element 14 is comprised of a resilient blade 20 and a flexible backing strip 22. The flexible backing strip 22 is connected to the superstructure 12 by means of claws 24 on the ends of the secondary yokes 18 of the superstructure 12. A windshield wiper arm 26 has a connector 28 connected to the end portion thereof, with the connector 28 being connected to a cross pin 30 of the wiper blade.

Referring to FIG. 2, the connector 28 has a body portion 32 which includes an arm-attaching part 34 and a blade-attaching part 36. In the form illustrated, the arm-attaching part 34 has an opening 38 extending longitudinally therein along the longitudinal axis of the connector 28. The opening 38 has a cross section to receive the straight end of the straight end wiper arm 26. An aperture 40 is formed near the open end of the connector 28, which aperture is adapted to receive a lug 41 formed on the end portion of said straight end wiper arm 26. To remove the arm 26 from the connector 28, the arm is pivoted down relative to the connector to disconnect the lug 41 from the walls of the aperture 40, whereupon the arm end can be withdrawn from the connector. It should be understood that the present description will go forth describing the connector 28 as an element separate from the arm end, however, the elements of the connector could be formed directly on the end of a wiper arm or could be permanently affixed to the end of a wiper arm without departing from the invention.

The bridge or primary yoke 16 of the wiper blade 10 is generally an inverted U-shape in cross section and has a pair of substantially parallel side walls 42,43 spaced from each other by a top wall 44. Substantially in the midportion of the bridge 16, an opening 45 is formed which is defined by the top edges 46,47 of the side walls 42,43 and by the end edges 48,49 of the back or top wall 44 of the bridge 16 of the superstructure 12. The cross pin or rivet 30 extends between the walls 42,43 of the bridge 16 and is secured therein permanently. The pin 30 is somewhat centered in the opening 45 and may have a sleeve thereabout that will rotate relative to the pin. The blade-attaching end portion 36 of the connector 28 includes an enlarged housing 50 extending downward from a top wall 51 of the connector 28. The housing 50 has an outer-shaped wall 52 which defines a pair of oppositely facing edges 53,54 lying in spaced apart parallel planes. A web 55 is attached somewhat midway between the edges 53,54 and joins the different portions of wall 52 together. The forward portion of wall 52 has a forwardly open pin-engaging slot 56 having a reduced neck portion 57 and an enlarged cylindrically-shaped elongate opening 58. At the neck 57 of the entry into the opening 58, the distance between the edges of the neck 57 is less than the diameter of the cross pin 30 on the blade. Two guide edges 59,60 converge toward the neck 57 of the opening 58 and serve as guides for guiding the pin 30 into the opening 58 in the slot 56.

Spaced from the cylindrical opening 58 and projecting outwardly from the planes of the side edges 53,54 of the connector 28 are a pair of latch legs 62,63 which are integrally formed with the top wall 51 of the connector 28. Each latch leg 62,63 is spaced from a cutout portion 64,65 of the wall 52 by an amount substantially equal to the width of the legs 62,63 so that when the legs are squeezed or depressed toward the web 55 of the connector 28, the outer walls 66,67 of the legs 62,63 will coincide with or will be inside of the planes forming the outer edges 53,54 of the connector 28. Each leg 62,63 has a downwardly facing contact edge or surface 68,69 which is spaced from the axis of the opening 58 by a predetermined amount. The material of the connector 28 has a memory so that when the legs 62,63 are depressed toward the body of the connector, they will immediately spring back or return to the extended position upon being released.

With the connector 28, as shown in FIG. 2, positioned generally above the bridge 16 of a wiper blade, it is ready for connection to the blade. The blade is rotated to the position of FIG. 3 so that the longitudinal axis of the blade is at substantially a right angle to the longitudinal axis of the connector. The legs 62,63 are depressed toward the center of the connector 28 as the cross pin 30 is aligned with the slot 56 and laid into the guides 59,60 of the connector. Pressure of the connector 28 toward the blade will thread the legs 62,63 inside the side walls 42,43 of the opening 45 in the bridge 16 as the cross pin 30 is forced passed the throat 57 and into the opening 58 in the connector. As the connector 28 is being forced toward the pin 30, the legs 62,63 can be released and they will bear against the inside surfaces of the side walls 42,43 of the bridge 16. The blade 10 is now rotated relative to the arm 26 to a point where the legs 62,63 will snap out from the confinement within the side walls 42,43 of the bridge 16 so that the facing surfaces 68,69 of the legs 62,63 will align with the upper edges 46,47 of the side walls 42,43 of the bridge 16 as is shown in FIG. 3. The edges 53,54 of the housing 50 are closely spaced relative to the inside walls 42,43 of the blade so as to guide the relative movement of the blade relative to the arm. The confined guiding by the edges 53,54 in the walls 42,43 will add stability to the connection and prevent chatter of the blade. In normal operation, the longitudinal axis of the arm will be substantially parallel to the longitudinal axis of the blade with the legs 62,63 spaced considerably above the upper edges 46,47 of the opening 45 in the bridge 16. The blade 10 can be articulated relative to the arm 26 through a relatively wide angle, which would far exceed the normal angle of articulation of the blade during normal use. Lifting the arm 26 and blade 10 from the windshield will not release the blade from the arm. The only way that the blade 10 can be released from the arm 26 is to squeeze or depress the legs 62,63 of the connector 28 and pivot the blade 10 about the axis of the cross pin 30 until the legs 62,63 thread between the walls 42,43 of the opening 45 in the bridge 16. The legs 62,63 can now be released and they will bear against the inner surface of the walls 42,43 of the bridge 16. The blade 10 can now be removed from the arm 26 by pulling the arm away from the blade until the throat 57 in the entry into the opening 58 releases the pin 30.

It should be clear that I have shown and described an improved connector for a windshield wiper arm connection to a blade which cannot be released from the blade without affirmatively depressing latching members on the connector. Therefore, the blade cannot be removed from the arm accidentally and, yet, when it is desired to remove the blade from the arm, it can be done readily and conveniently.

I claim:

1. A connector for connecting a windshield wiper arm to a blade, said connector having a blade-receiving part, said blade-receiving part having a slot formed therein along an axis transverse to the longitudinal axis of the connector, a latch means formed on said body portion in spaced relation to said body portion, said latch means being urged toward said body portion an amount sufficient to fit the latch means inside the spaced side walls of an opening in said blade, whereby the connector is moved transverse to the longitudinal axis of the blade until the latch means are disposed between the side walls and the slot in the connector passes over the cross pin to seat the cross pin in said slot, and whereby pivoting the connector about the axis of the cross pin permits the latch means to snap out of the opening in the blade, said latch means engaging the top edges of the opening in the blade whenever the connector is pivoted excessively with respect to the blade.

2. In a connector as claimed in claim 1 wherein said slot has guide means that engage with the cross pin to guide the movement of the cross pin into the slot.

3. In a connector as claimed in claim 2 wherein said guide means converge to a throat portion beyond which a cylindrically-shaped opening is provided, and wherein said cross pin seats in said cylindrically-shaped opening.

4. In a connector as claimed in claim 1 wherein said latch means are a pair of outwardly directed legs on said connector which have facing contact surfaces aligned with and adapted to contact the top edges of the blade.

5. A connector for connecting a windshield wiper arm to a blade, said connector having a body portion with a blade-receiving part, said blade-receiving part having a slot formed therein along an axis transverse to the longitudinal axis of the adaptor, said slot having a throat portion and an enlarged pin-receiving portion, a pair of legs formed on said body portion and lying parallel to said body portion and being spaced outwardly from said body portion, and said legs being adapted to be squeezed toward each other an amount sufficient to permit the outer edges thereof to fit inside a pair of spaced side walls of an opening in said blade, whereby squeezing said legs together and aligning the slot with a cross pin on the blade and moving the connector toward said blade until the legs are disposed between the side walls and the slot in the connector passes over the cross pin will seat the cross pin in said slot and whereby pivoting the connector about the axis of the cross pin permits the legs to snap out of the opening in the blade, said legs engage the top edges of the opening in the blade whenever the connector is pivoted by an excessive amount with respect to the blade.

6. A connector as claimed in claim 5 wherein said legs are formed integrally with said body portion and project outwardly therefrom, said legs have a contact surface facing in the direction of said slot in said body portion whereby said contact surface contacts the edges of said opening in the blade to limit relative motion between the arm and blade.

7. A connector as claimed in claim 5 wherein said legs are squeezed together as the blade is pivoted to a position substantially transverse to the axis of the arm with said legs threaded inside the side walls of the blade, whereupon the arm can be separated from the blade by pulling one relative to the other.

8. A connector for connecting a windshield wiper arm to a blade, said connector having a body portion with a longitudinal axis, said body portion having an arm-receiving part and a blade-receiving part, said blade-receiving part having a slot formed therein along an axis transverse to the longitudinal axis of the connector, a pair of legs formed on said body portion and lying parallel to said body portion in spaced apart relation thereto, said legs being squeezed toward said body portion an amount sufficient to fit the legs inside the spaced side walls of an opening in said blade, whereby the connector is moved transverse to the longitudinal axis of the blade until the legs are disposed between the side walls and the slot in the connector passes over the cross pin to seat the cross pin in said opening in the connector, and whereby pivoting the connector about the axis of the cross pin permits the legs to snap out of the opening in the blade, said legs engaging the top edges of the opening in the blade whenever the connector is pivoted excessively with respect to the blade.

9. In a connector as claimed in claim 8 wherein said slot has guide means that engage with the cross pin to guide the movement of the cross pin into the slot.

10. In a connector as claimed in claim 8 wherein said arm-receiving part is an open end adapted to receive a straight end of a straight end wiper arm.

* * * * *